(No Model.) 2 Sheets—Sheet 1.
H. I. POTTER.
TILE DITCHER.
No. 363,540. Patented May 24, 1887.
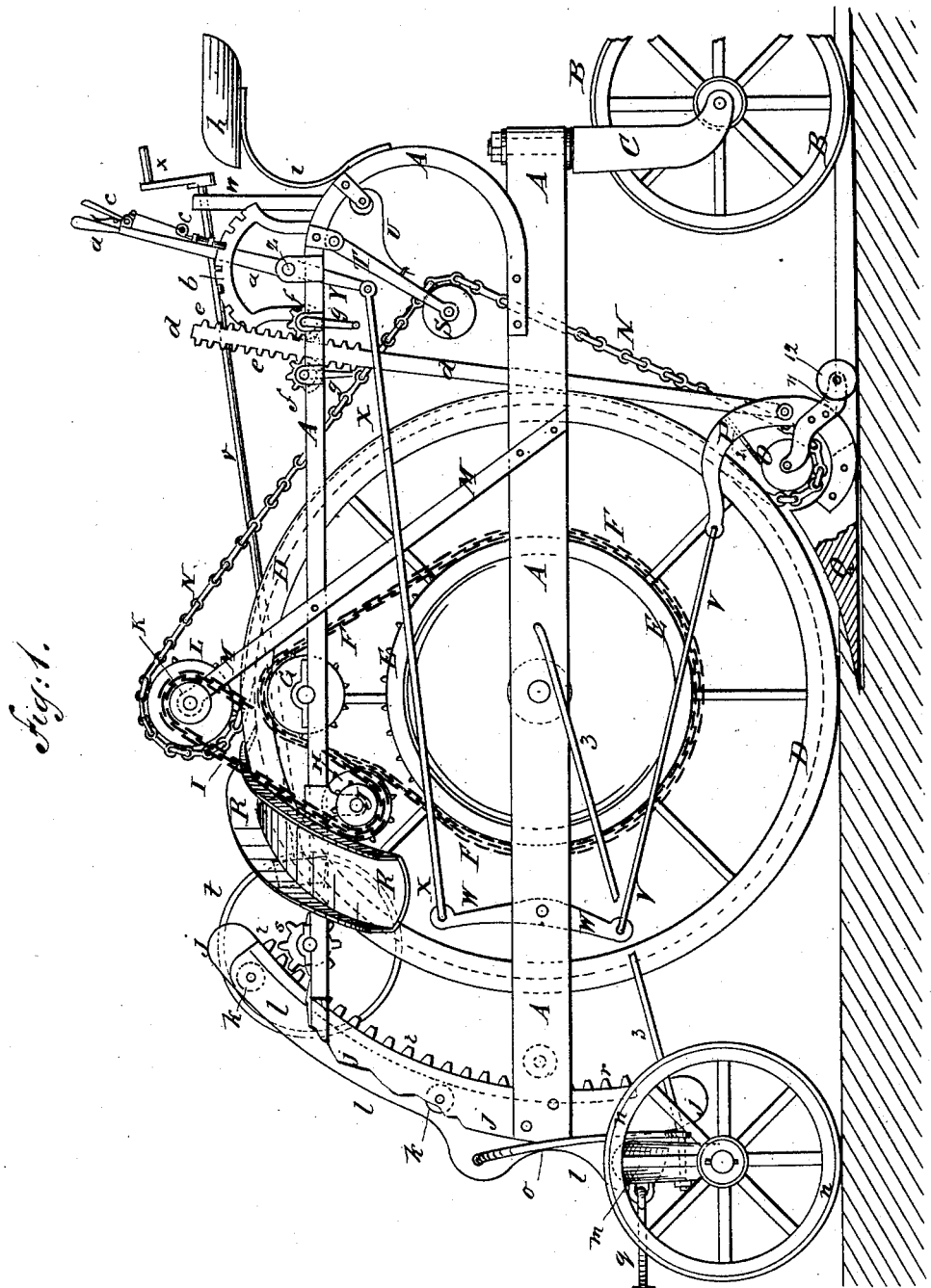
WITNESSES:
INVENTOR:
H. I. Potter
BY Munn & Co
ATTORNEYS.

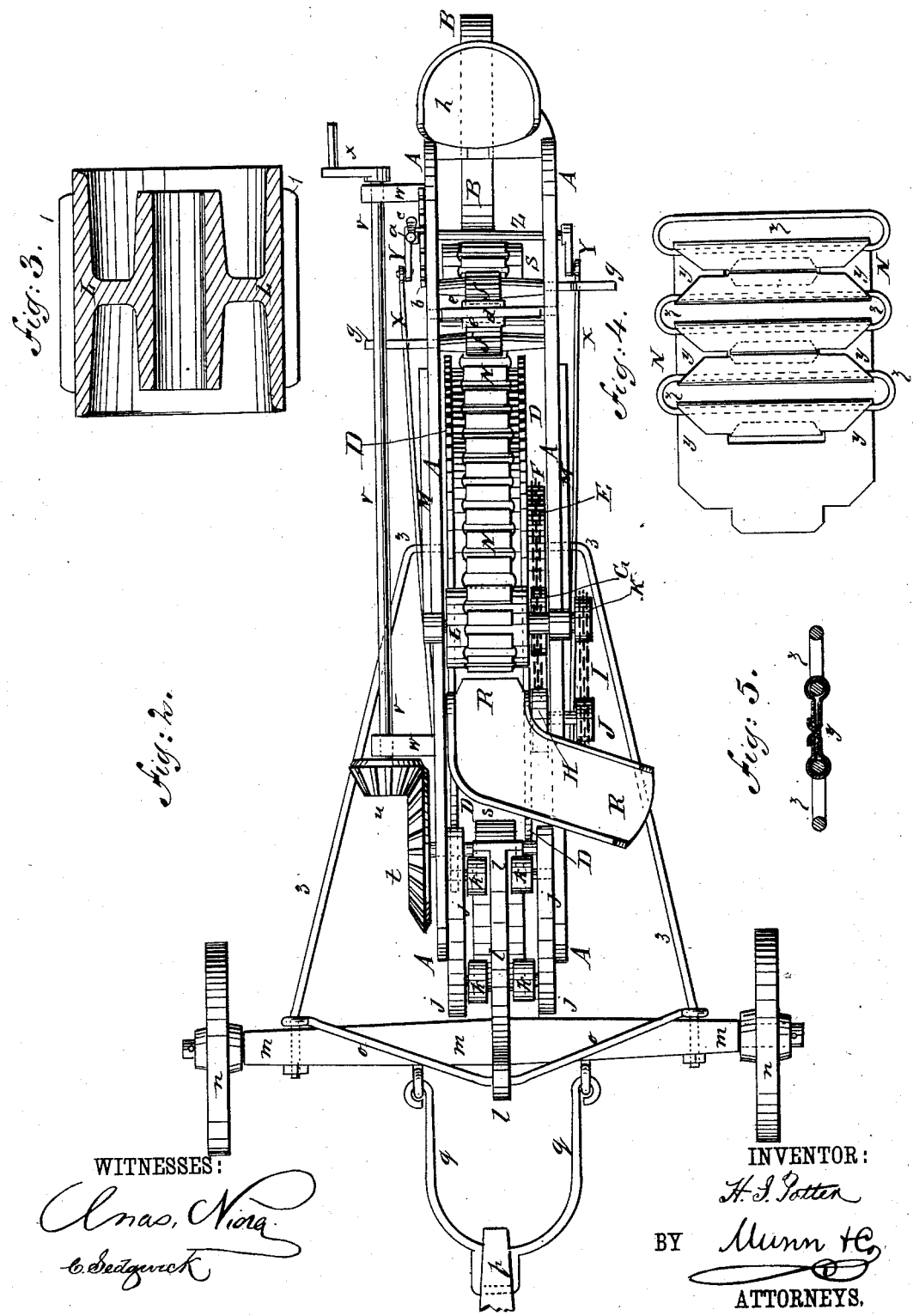

UNITED STATES PATENT OFFICE.

HERMAN I. POTTER, OF LEONARDSBURG, OHIO.

TILE-DITCHER.

SPECIFICATION forming part of Letters Patent No. 363,540, dated May 24, 1887.

Application filed June 3, 1886. Serial No. 204,028. (No model.)

*To all whom it may concern:*

Be it known that I, HERMAN I. POTTER, of Leonardsburg, in the county of Delaware and State of Ohio, have invented a new and useful Improvement in Tile-Ditchers, of which the following is a full, clear, and exact description.

Reference is to be had to the accompanying drawings, forming a part of this specification, in which similar letters of reference indicate corresponding parts in all the figures.

Figure 1 is a side elevation of my improved tile-ditcher, parts being broken away. Fig. 2 is a plan view of the same. Fig. 3 is a sectional elevation of the chain-wheel. Fig. 4 is a plan view of a section of the endless chain. Fig. 5 is a sectional edge view of the same.

The object of this invention is to provide tile-ditchers constructed in such a manner as to raise the dirt from the bottom of the ditches and deposit it upon the ground at the sides of the said ditches, and which shall be simple in construction, readily controlled, and reliable in operation.

The invention consists in the construction and combination of various parts of the tile-ditcher, as will be hereinafter fully described.

A represents the frame of the machine, which consists of two pairs of side bars connected at their rear ends by a curved or upright bar. The rear end of the machine is supported by a caster-wheel, B, the standard C of which is swiveled to a bearing formed in or attached to the rear ends of the lower side bars of the frame A.

To and between the middle parts of the lower side bars of the frame A is journaled a large wheel, D, the rim of which is grooved to form a channel in which the dirt is carried up from the bottom of the ditch.

To the side of the wheel D is secured a large chain-wheel, E, around which passes an endless chain, F. The endless chain F also passes around a smaller chain-wheel, G, journaled to the upper side bar of the frame A. Into the downwardly-moving part of the endless chain F meshes the teeth of a chain-wheel, H, journaled to hangers attached to the upper side bars of the frame A, so that the chain-wheel H will be at a lower level than the chain-wheel G. To one of the journals of the chain-wheel H is attached a chain-wheel, J, around which passes an endless chain, I. The endless chain I also passes around a small chain-wheel, K, attached to a journal of the chain-wheel L, which is journaled to supports M, attached to the side bars of the frame A. Around the chain-wheel L passes an endless chain, N, the forward part of which passes along the channel in the rear part of the wheel D. The endless chain N passes around the small chain wheel or pulley O, pivoted to supports attached to the standards P of the plow Q in such a position that the dirt raised by the said plow will be carried up by and between the said chain and the channeled rim of the wheel D, and will be discharged upon the ground at the side of the ditch through the spout R, the inner end of which is so formed as to fit into the channel in the wheel D and serve as a scraper to remove the dirt from the said channel.

The rear part of the endless chain N passes around a chain wheel or pulley, S, pivoted to a swinging support, T, suspended from the upper side bars of the frame A, and held back to put the said chain N under the desired tension by a spring, U, connected with the said swinging support T and the said frame A.

The upper parts of the plow-standards P are curved forward, and to their ends are pivoted the rear ends of the rods V, which pass forward at the sides of the ditcher, and are pivoted at their forward ends to the lower ends of the levers W. The levers W at their middle parts are pivoted to the forward parts of the frame A, and to their upper ends are pivoted the forward ends of the rods X, the rear ends of which are pivoted to the ends of crank-arms Y, formed upon or attached to the short shaft Z. The shaft Z is journaled to the rear parts of the upper side bars of the frame A, and to the said shaft is attached a lever, *a*, which moves along a catch-bar, *b*, attached to the said frame A, and recessed to receive the spring-lever pawl *c*, connected with the lever *a*, so that the said lever will be held securely in any position into which it may be adjusted.

With this construction the pitch of the plow can be readily regulated by adjusting the lever *a*.

To and between the middle parts of the standards P is pivoted the lower end of the bar *d*, which passes up between the side bars of the frame A, and has rack-teeth *e* upon the front and rear sides of its upper end to engage with the gear-wheels *f*, placed in front and rear of the said bar and journaled to the upper side bars of the frame A. To a journal of each of the gear-wheels $f$, upon the opposite sides of the frame A, are attached cranks $g$, upon which rest the driver's feet, so that the driver by pushing one of his feet forward will raise the plow Q to cause it to cut a shallower furrow, and by pushing his other foot forward will lower the said plow to cut a deeper furrow.

$h$ is the driver's seat, the standard $i$ of which is attached to the rear end of the frame A.

To the inner sides of the forward ends of the side bars of the frame A are attached two parallel bars, $j$, which are curved upon the arcs of circles having their centers at the points where the rear ends of the braces 3 are connected with the side bars of the said frame A, so that the forward end of the said frame A can move up and down on the curved bar $l$.

To the inner sides of the curved bars $j$ are pivoted rollers $k$, which rest and roll upon the side flanges of the bar $l$, interposed between the bars $j$ and similarly curved. To the outer part of the lower end of the curved bar $l$ is rigidly attached the center of the arched axle $m$, the wheels $n$ of which travel on the ground at the opposite sides of the ditch. The connection between the curved bar $l$ and the axle $m$ is strengthened by the braces $o$, attached to the said curved bar and to the said axle. The axle $m$ is connected with the frame A by braces 3, the forward ends of which are rigidly attached to the said axle. The rear ends of the braces 3 are pivoted to the middle parts of the side bars of the frame A, to allow the forward end of the said frame A to have an up-and-down movement, while the said axle $m$ is firmly held in place by the said braces.

$p$ is the tongue, the rear end of which is connected with the axle $m$ by hinged braces or hounds $q$.

Upon the rear or concave side of bar $l$ are formed rack-teeth $r$, with which engage the teeth of the pinion-wheel $s$, journaled to the forward parts of the upper side bars of the frame A. One of the journals of the pinion-wheel $s$ projects and to it is attached a large beveled gear-wheel, $t$, into the teeth of which mesh the teeth of the beveled pinion-wheel $u$, attached to the forward end of the shaft $v$. The shaft $v$ revolves in bearings in supports $w$, attached to an upper side bar of the frame A, and to its rear end is attached a crank, $x$, in such a position that it can be readily reached and operated by the driver from his seat. With this construction the driver, by operating the crank $x$, can lower the forward end of the frame A, lowering the wheel D and plow Q into position to remove another slice of dirt from the bottom of the ditch, and can raise the said wheel and its attachments when desired.

The endless chain N, that holds the dirt while being raised against the channeled wheel D, is formed of plates $y$ and links $z$. The plates $y$ have eyes in their edges to receive the side bars of the links $z$, as shown in Figs. 4 and 5. The driving chain-wheel L is provided with cogs 1 of such a length and thickness as to enter and work in the links $z$ of the endless chain N, the ends of the said links resting on the said wheel or on shoulders at the ends of the cogs 1.

If desired, the chain-wheels L O and the endless chain N can be replaced by pulleys and a belt; but I prefer to use the chain-wheels and endless chain as being positive in their movements.

When the chain-wheels and endless chain are used, a scraper, 2, supported from the plow-standards P, is placed above the wheel O, to remove any dirt that may adhere to the said wheel. To the plow-standards P are attached rearwardly and downwardly projecting bars 11, to the outer sides of the rear ends of which are pivoted or otherwise secured circular rotary cutters 12, or other suitably-shaped cutters, to shave off the sides of the ditch at the opposite sides of the furrow being cut, and thus give such a width to the said ditch that the ditcher in its next passage can move freely and without binding.

Having thus described my invention, what I claim as new, and desire to secure by Letters Patent, is—

1. In a tile-ditcher, the combination, with the frame A, the wheel D, having channeled rim, and the plow P Q, of the rods V X, the cranks Y, and the levers W $a$, substantially as herein shown and described, whereby the pitch of the said plow can be readily regulated, as set forth.

2. In a tile-ditcher, the combination, with the frame A, the wheel D, having channeled rim, and the plow P Q, of the bar $d$, having rack-teeth $e$, the pinion-wheels $f$, engaging the said teeth, and the foot-cranks $g$, substantially as herein shown and described, whereby the said plow can be readily raised and lowered, as set forth.

3. In a tile-ditcher, the combination, with the frame A, carrying the channeled wheel D, and the plow P Q, of the curved bars $j$, provided with rollers $k$, the curved and flanged bar $l$, interposed between the said bars $j$ and provided with rack-teeth $r$ upon its concave side, the pinion-wheel $s$, engaging with the said rack-teeth, the beveled gear-wheels $t$ $u$, and the shaft $v$ and crank $x$, substantially as herein shown and described, whereby the frame and its attachments can be readily lowered and raised, as set forth.

4. In a tile-ditcher, the combination, with the curved and flanged bar $l$, the curved bars $j$, having rollers $k$, and the frame A, carrying the channeled wheel D, and the plow P Q, of the wheels and axle $n$ $m$, the braces $o$, and the tongue $p$ $q$, substantially as herein shown and described, whereby the draft can be readily applied to the machine, as set forth.

HERMAN I. POTTER.

Witnesses:
F. M. MARRIOTT,
CHARLES W. KNIGHT.